Patented Feb. 18, 1947

2,416,198

UNITED STATES PATENT OFFICE 2,416,198

GROWTH PROMOTING SUBSTANCES

Wendell W. Moyer, Decatur, Ill., assignor to A. E. Staley Manufacturing Company, Decatur, Ill., a corporation of Delaware No Drawing. Application April 8, 1943, Serial No. 482,337

4 Claims. (Cl. 71—2)

This invention relates to growth promoting substances. More particularly, it pertains to the discovery that a class of substances which are derivatives of levulinic acid are useful to promote the growth of chlorophyll-bearing plants and to increase yield of agricultural products, and the practical application of these substances and mixtures thereof, with or without levulinic acid, is a principal object of the invention.

Other objects of the invention will in part be obvious and will in part appear hereinafter.

The invention accordingly comprises a composition of matter possessing the characteristics, properties and the relation of components which will be exemplified in the composition hereinafter described and the scope of the application of which will be indicated in the claims.

My invention, furthermore, is based on the discovery that plant hormone activity is possessed to an enhanced degree, by a certain class of derivatives of levulinic acid. These substances are derived from levulinic acid by reactions of various reagents with the carbonyl group of levulinic acid. Specifically, the invention resides in the discovery that carbonyl derivatives of levulinic acid are effective plant growth stimulants. Not only is the growth of plants stimulated by appropriate treatment of the seeds or growing plants with carbonyl derivatives of levulinic acid but also the yields of fruits and agricultural produce are increased by such substances.

Levulinic acid may be called gamma-keto valeric acid and has the molecular structure $$CH_3—CO—CH_2—CH_2—COOH$$

The carbon atom in gamma position from the terminal acidic carboxyl group is bonded to an atom of oxygen and forms a carbonyl group. The delta carbon atom is a methyl group. Consequently, one end of the molecule of levulinic acid has the structure of a methyl-alkyl ketone.

I have reacted levulinic acid with a wide variety of reagents and produced derivatives of levulinic acid. The following are some typical carbonyl derivatives which I have produced and which I have also discovered possess excellent growth promoting characteristics:

(1) The oxime, formed by the reaction between levulinic acid and hydroxylamine,—

$$CH_3—CO—CH_2—CH_2—COOH +$$
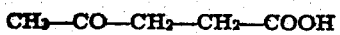
$$NH_2OH = CH_3—C—CH_2CH_2COOH + H_2O$$
$$\overset{\|}{NOH}$$

(2) The phenylhydrazone, formed by the reaction between levulinic acid and phenylhydrazine, $$CH_3—CO—CH_2CH_2—COOH +$$
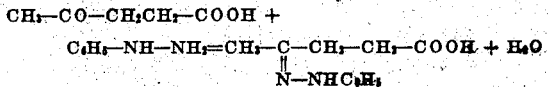
$$C_6H_5—NH—NH_2 = CH_3—C—CH_2—CH_2—COOH + H_2O$$
$$\overset{\|}{N—NHC_6H_5}$$

(3) The semicarbazone, formed by the reaction between levulinic acid and semicarbazide, $$CH_3COCH_2CH_2COOH +$$
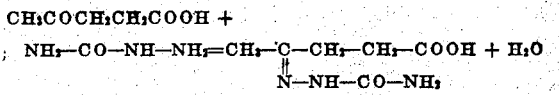
$$NH_2—CO—NH—NH_2 = CH_3—C—CH_2—CH_2—COOH + H_2O$$
$$\overset{\|}{N—NH—CO—NH_2}$$

(4) The ketal, formed by the reaction between levulinic acid and an alcohol such as ethanol under appropriate conditions, $$CH_3CO—CH_2—CH_2COOH +$$
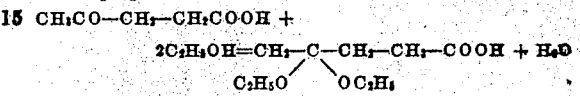
$$2C_2H_5OH = CH_3—C—CH_2—CH_2—COOH + H_2O$$
$$C_2H_5O \diagup \diagdown OC_2H_5$$

(5) The thioketal, formed by the reaction between levulinic acid and a mercaptan, such as ethyl mercaptan, $$CH_3—CO—CH_2CH_2—COOH +$$
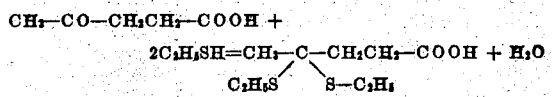
$$2C_2H_5SH = CH_3—C—CH_2CH_2—COOH + H_2O$$
$$C_2H_5S \diagup \diagdown S—C_2H_5$$

(6) The bisulfite addition product formed by the addition of sodium bisulfite to levulinic acid, $$CH_3—COCH_2CH_2COOH +$$
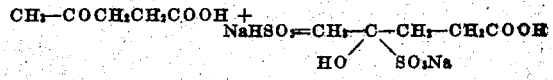
$$NaHSO_3 = CH_3—C—CH_2—CH_2COOH$$
$$HO \diagup \diagdown SO_3Na$$

The above is not a complete listing of all the carbonyl derivatives I have discovered for this particular use but is sufficiently illustrative of those groups contemplated as falling within the scope of the present invention.

Within certain of the above classes of reactions many different derivatives of the same general type have been prepared by me by the use of substitution derivatives of the reagents. For example, in place of using phenylhydrazine, substituted phenylhydrazines such as ortho-meta- and para-mono-nitrophenylhydrazines, or 2,4 dinitrophenylhydrazine, have been used to produce the corresponding nitrophenylhydrazones of levulinic acid. In the same way, halogen-substituted phenylhydrazines have been used to produce halogen-substituted phenylhydrazones of levulinic acid. In place of the phenyl group, naphthyl or other aryl groups, along with their substitution derivatives, have also been used. The total number of aryl groups and possibly substituent groups used are too numerous to mention here. I have found the same to be true in the production of thioketals as above set forth. The alkyl group can be changed almost at will, or substituted alkyl groups employed. As an illustration of the latter, thioglycollic acid, HS—CH₂—COOH in which a carboxyl group is substituted in a methyl alkyl group, has been used to make a thioketal of levulinic acid. The reaction products of all of the foregoing have all proved to possess varying degrees of growth promoting characteristics.

The carbonyl derivatives under consideration are all based on the parent five-carbon atom chain of luvulinic acid,

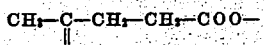

It should be noted that the bonds of the gamma carbon atom are attached to atoms other than hydrogen or carbon and only those reaction products having such a structural arrangement are contemplated. Other structural arrangements in this position, for example, a carbon-hydrogen bond, would comprise a reduction product of levulinic acid and place the derivative in the valeric acid series. Again, a carbon-carbon bond would change the basic structure of the five-carbon chain.

I have also found that the same kind and number of derivatives discussed above in reference to levulinic acid apply also to esters or salts of levulinic acid. In most cases an ester of levulinic acid such as methyl levulinate, $$CH_3COCH_2CH_2COOCH_3$$

can be used interchangeably with the free acid in the above reactions. In reference to salts, it is sometimes advisable to make the salts by acting upon the salt of levulinic acid with the carbonyl reagent; in other cases it is best to make the salt by neutralization of the levulinic acid derivative with an appropriate alkali. I have found that the types of salts best suited to this invention are those of metals ordinarily associated or used with plant materials such as calcium, magnesium, potassium, ammonium, sodium, manganese, etc. The types of esters which I have found to be best suited to the invention are those of the simple aliphatic alcohols. One advantage of the esters, other than the effect upon plant growth, is that certain esters of levulinic acid derivatives, particularly certain phenylhydrazone esters, are more chemically stable than the free acid derivatives.

The carbonyl derivatives of value in the present invention may all be represented by the general formula

In this formula M may represent a metallic ion such as calcium, potassium, ammonium, magnesium and the like, or an ion of any metal non-toxic to chlorophyll-bearing plants; M may also represent an alkyl radical such as methyl, ethyl, and the like; or, the terminal acidic carboxyl group only may be present.

X and Y are atoms of nitrogen, oxygen, sulfur, or other elements but are not carbon or hydrogen atoms. X and Y may be the same atom as in the case of a double bond.

All of the carbonyl derivatives have the straight five-carbon-atom chain of levulinic acid.

The invention contemplates any suitable method of treating plants, by spraying, dusting or by pre-treatment of the seed with a derivative of levulinic acid, selected from the group of carbonyl derivatives, in appropriate dispersion and concentration in a suitable carrier material for the purpose of stimulating the growth of plants and increasing the yields of plant products.

Among the carbonyl derivatives of levulinic acid which have been shown to be exceptional plant growth promoting substances are the oxime, semicarbazide, various mono- and dinitrophenylhydrazones, p-thiocyanophenylhydrazone and the dithioglycollic acid ketal of levulinic acid. In this class can be found plant growth promoters of varying physical and chemical properties which make them particularly valuable for specific plants and for particular methods of treatment.

The carbonyl derivatives can be employed in the form of free acids, salts of the acids, or esters of the acids, the choice depending upon the species of plant treated, the nature of the carrier material, the pH of the soil or optimum pH environment of the plant, the chemical stability of the derivative, the solubility of the derivative in water or other carrier liquids, and numerous other variable factors. In some kinds of treatments, esters or salts are more effective than the free acids. Some of the carbonyl derivatives difficulty soluble in water can be dispersed easily in water solution by converting partially or completely to salts, such as sodium, potassium or calcium salts. Ester derivatives are particularly valuable as ingredients in oil-base spraying compositions.

The concentration of these plant growth promoters in the carrier medium is important. Too high a concentration will injure or "burn" the plant, or in the case of seed treatment, inhibit or prevent germination. The plant hormone activity however is exerted by the substances in extremely dilute concentration and a range of 20 to 50 parts per million. In general, the carrier should preferably contain in the range of 0.01 to 2.0 per cent of active ingredients.

The methods for treating plants for stimulating growth and improving crop yields when using carbonyl derivatives of levulinic acid may involve treatment of the seed by soaking in an aqueous solution containing the hormone-like substance or dusting the seed with any suitable powder carrier such as, for example, soy bean flour, because of its characteristic oiliness and adhering qualities, before planting. Also the plants may be sprayed or dusted at various stages of growth after germination, particularly at the flowering stage with a view to the utilization of these reaction products for their abscission inhibiting characteristics.

Numerous large scale open field and greenhouse uses have been made which prove the efficacy of carbonyl derivatives of levulinic acid in stimulating the growth of plants and increasing the yields of agricultural crops.

Since certain changes may be made in the above composition of matter and different embodiments of the invention could be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A method of treating seeds before planting for stimulating growth of plants germinating from the planted seeds which comprises treating the seeds with a compound represented by the general formula

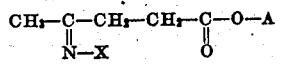

in which A represents a member selected from the class consisting of hydrogen and alkyl groups containing not more than four carbon atoms, and X represents a member selected from the class consisting of hydroxy, carbamido, arylamino, and ring-substituted arylamino groups.

2. A method of treating seeds before planting for stimulating growth of plants germinating from the planted seeds which comprises treating the seeds with the oxime of levulinic acid.

3. A method of treating seeds before planting for stimulating growth of plants germinating from the planted seeds which comprises treating the seeds with the p-thiocyanophenylhydrazone of levulinic acid.

4. A method of treating seeds before planting for stimulating growth of plants germinating from the planted seeds which comprises treating the seeds with the methyl ester of the semicarbazone of levulinic acid.

WENDELL W. MOYER.

REFERENCES CITED

The following references are of record in the file of this patent:

UNITED STATES PATENTS

| Number | Name | Date |
|---|---|---|
| 2,129,598 | Zimmerman et al. | Sept. 6, 1938 |
| 2,276,234 | Jones | Mar. 10, 1942 |
| 2,322,760 | Lontz | June 29, 1943 |
| 2,322,761 | Lontz | June 29, 1943 |

OTHER REFERENCES

Beilstein's Handbuch Der Organischen Chemie, vol. 3, vol. 15, Berlin 1932, page 346. (Copy in Division 6.)